May 31, 1960 C. K. REH 2,938,379
PRESSURE INDICATING VALVE CAP
Filed April 28, 1958
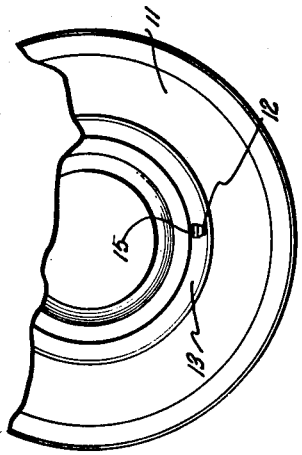
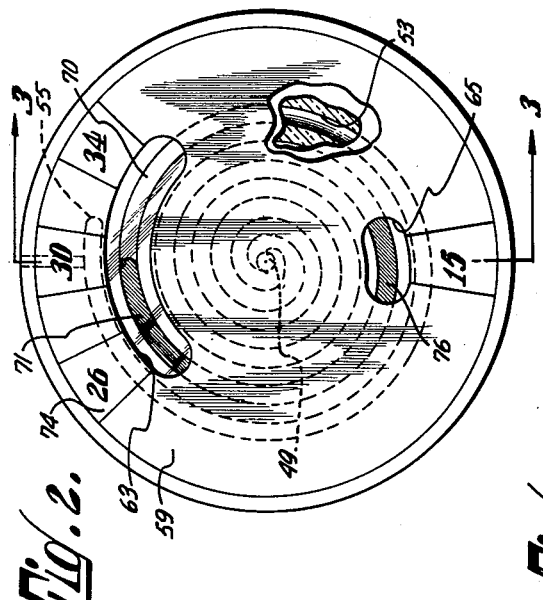
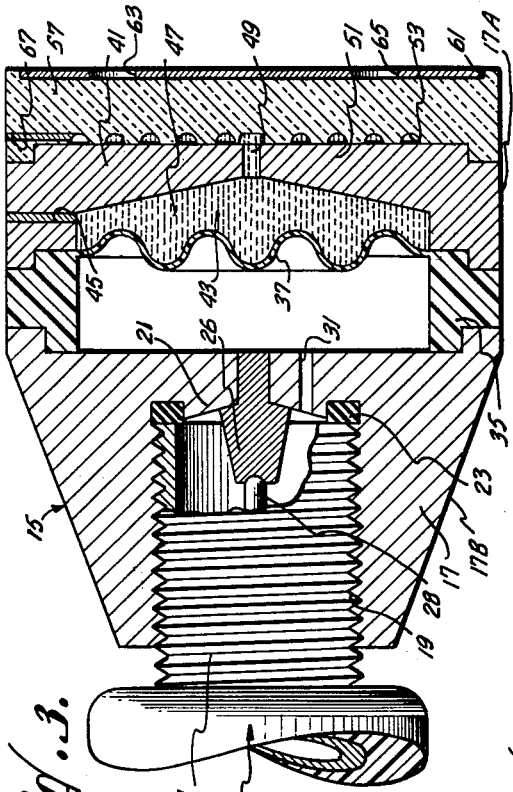
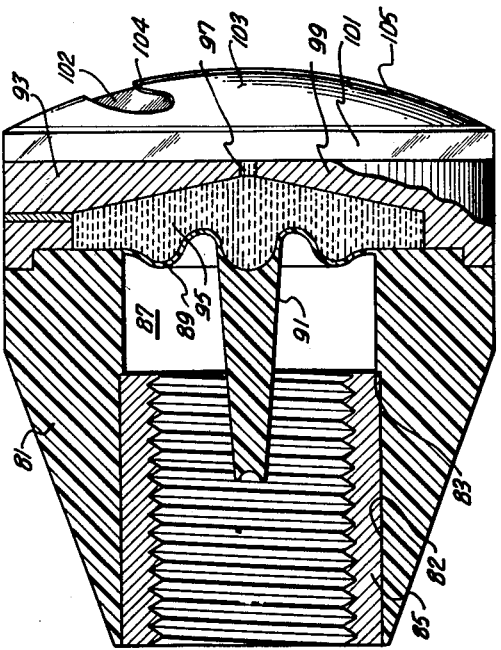
INVENTOR.
CARTER K. REH
BY
ATTORNEYS.

United States Patent Office 2,938,379
Patented May 31, 1960

2,938,379

PRESSURE INDICATING VALVE CAP

Carter K. Reh, Maracaibo, Venezuela, assignor to Peg Investment Group, Van Nuys, Calif., a corporation of California Filed Apr. 28, 1958, Ser. No. 731,449

2 Claims. (Cl. 73—146.8)

The invention relates to pressure caps and more particularly to valve caps indicating the pressure to which the valve is subjected.

It is customary to guard against valve leakage in pressure valves by placing a sealing cap over the valve. The sealing cap inhibits the escape of the pressure fluid contained by the valve and prevents the entry of harmful abrasives and dirt into the valve itself. An example of such a pressure valve is the conventional pneumatic steam valve used in conjunction with pneumatic vehicle tires. The valve is conventionally one in which internal pressure is retained by a valve which is spring-loaded to close. A standard valve for such use is the well known Schraeder tire valve.

Safe operation of most pressure systems including vehicle tires lies within a limited pressure range. The relative extent of the range depends upon the usage of the system. Variation of three or four pounds per square inch in a pneumatic tire is not critical. Other pressure systems may have lesser or greater tolerances. Auxiliary gauges are generally used to make periodic checks of the existing pressure at the valve or unvalved inspection port.

I have invented a combined sealing cap and pressure indicator for use in hydraulic or pneumatic pressure systems to ease visible inspection of pressure levels. The invention contemplates the use of the cap and indicator with a pressure port which may be a stem valve held closed by a spring. The invention may be embodied in a cap which comprises a substantially cylindrical cap body, a port receiving orifice in the body, a fluid chamber, and a diaphragm cavity adjacent the fluid chamber in the body. The diaphragm cavity is open to fluid flow from the port receiving orifice, and a pressure diaphragm forms a sealing wall between the cavity and the chamber. An exteriorly visible passageway extends from the fluid chamber to a closed end. Preferably the passageway is a spiral lying substantially within a plane. A gas column is retained in the passageway remote from the chamber. A colored fluid fills the chamber and is movable against the gas column in the passageway in response to changes in the position of the diaphragm caused by the change in pneumatic pressure from the open port. When the port is a spring-loaded stem valve, a depressor in the cap body is supported therein so as to hold the stem valve open.

Preferably pressure indicating indicia are disposed along the extent of the passageway. The depressor may be supported in the orifice by a perforated wall extending transversely across the orifice or may be supported centrally of the pressure diaphragm. The pressure cap body may be formed of a plurality of components which are hermetically bonded together.

In a preferred embodiment the port receiving orifice is threaded to engage the stem valve of a pneumatic tire. A depressor is carried by a perforated wall intervening between the receiving orifice and a diaphragm cavity formed in an annular plastic ring. A convoluted pressure diaphragm seals one face of the plastic ring. Preferably the diaphragm and the ring are formed integrally. A first disk having a fluid chamber therein is bonded to the ring so that the fluid chamber opens adjacent the diaphragm. A central port extends through the disk and connects to a spiral passageway incised in one face of a second disk made of a light transmitting material. A colored liquid fills the fluid chamber. The second disk is bonded to the first disk so that the spiral grooved passageway opens only at the port extending through the first disk. A calibrated plate is fixed to the exterior of the light transmitting disk. The calibrations coordinate with the extent of the grooved passageway so that liquid flow into the passageway under the urging of the pneumatically displaced diaphragm is read in terms of pressure.

In addition to sealing the stem valve against escaping gas and entry of dirt, the invention provides a device which affords instant visual indication of the pressure being retained. These and other advantages of the invention are apparent in the following detailed description and drawing in which:

Fig. 1 is a fragmentary illustration of a vehicle tire equipped with a preferred embodiment of the invention;

Fig. 2 is a plan view of a pressure indicating valve cap in accordance with the invention;

Fig. 3 is a revolved sectional elevation taken along line 3—3 of Fig. 2; and

Fig. 4 is a revolved sectional elevation similar to Fig. 3 and illustrating an alternate embodiment of the invention.

In Fig. 1 a pneumatic vehicle tire 11 has a stem valve 12 extending through a wheel rim 13. A pressure indicating valve cap 15 is threadably engaged with the stem valve. As shown in Figs. 2 and 3, the pressure indicating valve cap comprises a cap body 17 having a cylindrical portion 17A and a conical section 17B. An internally threaded bore 19 in the conical section terminates in a perforated transverse wall 21. A sealing ring 23 seats in the wall at the end of the bore. The threaded stem 24 of the valve 12 makes sealing contact with the seal 23. A depressor 26 is supported by wall 21 and pushes against valve rod 28 so that the stem valve is held open. The wall is perforated by one or more holes such as the hole 31.

Pneumatic pressure from the valve is communicated through hole 31 to a diaphragm cavity 33. The cavity is circumscribed by a plastic ring 35 which is part of cylindrical section 17A. The ring is bonded to section 17B by any suitable bonding agent.

A convoluted pressure diaphragm 37 closes one end of the diaphragm cavity. Preferably the diaphragm is formed integrally with the plastic ring. The diaphragm effectively seals the cavity and combines with the ring and conical section to form a sealing cap for the open valve.

A disk 41 having substantially the same diameter as ring 35 has an annular fluid chamber 43 open at one end. Disk 41 is bonded to ring 35 so that the fluid chamber opens against the pressure diaphragm. The extreme diameter of the fluid chamber is sufficiently large to encompass the diaphragm. A radial hole 45 extends through the outer wall of disk 41 into the fluid chamber. A colored liquid 47 is introduced through hole 45 into the fluid chamber and then the hole is plugged by conventional means.

A central port 49 extends through a transverse wall 51 of the first disk. The port opens into the central end of a fluid passageway 53 which spirals outwardly from the port to a closed end 55. The passageway is incised in one face of a light transmitting second disk 57 bonded to the first disk. The incision and a face of the first disk define the passageway.

Fluid or liquid may flow from chamber 43 through port 49 into the passageway. A calibrated plate or mask 59 lodges in a recess 61 in the outer face of the second disk.

A large arcuate opening 63 in the calibrated disk affords visual inspection of the passageway 53 through the light transmitting disk. A second similar arcuate opening 65 affords visual inspection of a different portion of the extent of the passageway.

Second disk 57 has a small radial bore 67 extending from its outer wall to the outermost winding of the spiral groove. Calibration of the pressure indicator is achieved by either gas input or withdrawal through this bore. When the requisite gas column is achieved within the passageway the small bore is plugged.

When the cap body is threaded onto a tire stem valve the depressor bears against valve spring rod 28 and overcomes the conventional valve spring (not shown) and opens the valve. The pressure which the valve retains enters the diaphragm cavity through perforated wall 21. The pneumatic pressure distorts pressure diaphragm 37 and displaces colored liquid 47 through port 49 into the spiral passageway.

A gas column 70 is compressed in accordance with the pressure upon the diaphragm. As shown in Fig. 2, the juncture between a lead portion 71 of the colored liquid and gas column 70 (indicated by the unshaded area within the passageway) indicates clearly the distance the colored liquid has been forced along the passageway.

Aperture 63 is bordered by an indicating scale 74 which is marked in terms of pounds per square inch of pressure. The aperture spans the normal safe tire pressure which may extend from 25 to 35 pounds. Mask 59 may be aperturred according to the use of the indicating cap.

Aperture 65 in the mask is provided to indicate a minimum pressure. As illustrated in Fig. 2 a segment 76 of the colored liquid is still visible through that aperture. This indicates that pressure although it may not be as high as 26 pounds, is still greater than 15 pounds. Should no colored liquid be visible at aperture 65, the tire is dangerously under-inflated.

The embodiment illustrated in Fig. 4 comprises a partially conical plastic body portion 81 having a stepped bore 82 in which an annular shoulder 83 stops a metallic internally threaded bushing 85 pressed into the stepped bore to accommodate a stem valve similar to valve 12 shown in Fig. 3. Preferably the body portion is of plastic.

The lesser section of the bore beyond shoulder 83 comprises a diaphragm cavity 87. The cavity is closed at one end by a pressure diaphragm 89. The diaphragm has a convoluted surface which supports a depressor 91 centrally of the bore. The depressor performs the same function as depressor 26 of Fig. 3. Preferably the diaphragm and depressor are formed integrally with cap body portion 81.

A disk 93 similar in all respects to disk 41 of Fig. 3 is hermetically bonded to the face of body portion 81 so that the opening of a fluid chamber 95 is adjacent the diaphragm. A centrally located port 97 extends through an outer wall 99 of the disk and opens into a spiral passageway like passageway 53 of Fig. 3. The passageway is incised in a light transmitting second disk 101. Disk 101 has a convex outer face 102 over which a calibrated plate or mask 103 is secured. The mask has apertures 104 and 105 similar to apertures 63 and 65 of Fig. 2.

The operation of the embodiment of Fig. 4 is the same as that of the device illustrated in Figs. 2 and 3. The depressor keeps the valve open and pneumatic pressure impinges upon the diaphragm. The displacement of the diaphragm affects the amount of fluid extending into the spiral passageway and the pressure which the valve normally retains is thereby registered by the calibrated mask. The colored fluid is visible through the apertures in the mask. The configuration of the second disk gives the viewer an enlarged picture of the colored fluid within the passageway.

Each of the embodiments illustrated may be economically manufactured. The embodiment of Fig. 4 has an operational advantage in that a rupture of the diaphragm to outside pressure does not result in total loss of the valve pneumatic pressure since such a rupture moves depressor 91 away from the valve and allows it to close. The convex second disk may be used with either of the illustrative embodiments and most of the parts utilized therein may be formed of economically molded plastics.

The contemplated cost of the device in accordance with the invention is such that all tires of a vehicle may be equipped with indicating caps at a very nominal cost. The inventive device adapts to use with a ported hydraulic or pneumatic pressure line whether or not the port is valved. While the illustrative embodiments are for use with externally threaded stem valves, internally threaded valves or ports are easily fitted with obvious minor structural alteration of the device.

The retained gas column may be altered to adapt the indicating valve cap of the invention from a pressure indicator to use in a vacuum system. The structure and principle of use are the same in either usage.

I claim:

1. A combined valve cap and pressure indicator for use with a pneumatic spring-closed stem valve having a threaded exterior comprising a conical body portion, a threaded bore at one end of the body portion adapted to fit the stem valve, a perforated transverse wall at the inner end of the threaded bore, a depressor supported by the wall and protruding into the threaded bore so as to hold the pneumatic valve open, a diaphragm ring hermetically bonded to the body portion, a diaphragm cavity defined by the ring, a pressure diaphragm formed integrally with the ring and closing one end thereof, a first disk, an open fluid chamber therein, said first disk being bonded to the diaphragm ring so that the fluid chamber opens adjacent the pressure diaphragm, a light transmitting second disk, an outwardly spiralling passageway formed in part in one face of the second disk and closed by a face of the first disk, means connecting the fluid chamber to the spiral passageway, a colored fluid contained within the fluid chamber, said fluid progressing outwardly in the spiral chamber as the pressure on the diaphragm increases, and calibrating means on the second disk registering the pressure indicated by the progression of the fluid along the spiral passageway.

2. Apparatus in accordance with claim 1 in which the calibrating means comprises an apertured mask secured to the second disk, and pressure indicating indicia correlated with the extent of the passageway bordering each aperture.

References Cited in the file of this patent

UNITED STATES PATENTS

| 1,048,212 | Roper | Dec. 24, 1912 |
| 1,490,036 | Sheppard | Apr. 8, 1924 |
| 2,536,632 | Ernst | Jan. 2, 1951 |

FOREIGN PATENTS

| 923,559 | France | Feb. 24, 1947 |
| 735,320 | Great Britain | Aug. 17, 1955 |